(12) United States Patent
Takai

(10) Patent No.: US 6,911,767 B2
(45) Date of Patent: Jun. 28, 2005

(54) FIELD EMISSION DEVICES USING ION BOMBARDED CARBON NANOTUBES

(75) Inventor: Mikio Takai, Hyogo (JP)

(73) Assignee: Hyperion Catalysis International, Inc., Cambridge, MA (US)

( * ) Notice: Subject to any disclaimer, the term of this patent is extended or adjusted under 35 U.S.C. 154(b) by 0 days.

(21) Appl. No.: 10/171,773

(22) Filed: Jun. 14, 2002

(65) Prior Publication Data

US 2003/0044519 A1 Mar. 6, 2003

Related U.S. Application Data

(60) Provisional application No. 60/298,228, filed on Jun. 14, 2001.

(51) Int. Cl.⁷ .................................................. H01J 1/05
(52) U.S. Cl. ........................ 313/311; 445/50; 313/309
(58) Field of Search ........................ 313/309–311, 495, 313/326, 336, 351, 345 R; 445/49–51

(56) References Cited

U.S. PATENT DOCUMENTS

| | | | |
|---|---|---|---|
| 4,663,230 A | | 5/1987 | Tennent |
| 5,889,372 A | | 3/1999 | Beeteson et al. |
| 6,087,765 A | | 7/2000 | Coll et al. |
| 6,100,628 A | * | 8/2000 | Coll et al. ................... 313/310 |
| 6,129,901 A | | 10/2000 | Moskovits et al. |
| 6,504,292 B1 | * | 1/2003 | Choi et al. ................... 313/310 |
| 6,565,403 B1 | * | 5/2003 | Amey et al. ................... 445/51 |
| 6,630,772 B1 | * | 10/2003 | Bower et al. ................ 313/311 |
| 6,645,028 B1 | * | 11/2003 | Dean et al. ...................... 445/6 |
| 6,780,075 B2 | * | 8/2004 | Okamoto et al. ............. 445/50 |

FOREIGN PATENT DOCUMENTS

| | | |
|---|---|---|
| CA | 2315132 | 2/2001 |
| EP | 0 989 579 A2 | 3/2000 |
| EP | 1 020 888 A1 | 7/2000 |
| EP | 1 022 763 A1 | 7/2000 |
| EP | 1 022 764 A1 | 7/2000 |
| EP | 1 046 613 A2 | 10/2000 |
| EP | 1 059 266 A3 | 12/2000 |
| EP | 1 059 266 A2 | 12/2000 |
| EP | 1 061 040 A1 | 12/2000 |
| EP | 1 061 041 A1 | 12/2000 |
| EP | 1 061 043 A1 | 12/2000 |
| EP | 1 061 544 A1 | 12/2000 |
| EP | 1 073 090 A2 | 1/2001 |
| EP | 0 989 579 A3 | 3/2001 |
| GB | 2 353 138 A | 2/2001 |
| WO | WO 99/65821 | 12/1999 |
| WO | WO 00/30141 | 5/2000 |
| WO | WO 00/40508 | 7/2000 |
| WO | WO 00/63115 | 10/2000 |
| WO | WO 00/73203 A1 | 12/2000 |
| WO | WO 00/73204 A1 | 12/2000 |
| WO | WO 00/76912 A2 | 12/2000 |
| WO | WO 01/08193 A1 | 2/2001 |
| WO | WO 01/09914 A1 | 2/2001 |
| WO | WO 01/23303 A1 | 4/2001 |

* cited by examiner

*Primary Examiner*—Wilson Lee
(74) *Attorney, Agent, or Firm*—Kramer Levin Naftalis & Frankel LLP; Barry Evans, Esq.

(57) ABSTRACT

The present invention relates to a field emission device comprising an anode and a cathode, wherein said cathode includes carbon nanotubes which have been treated with an ion beam. The ion beam may be any ions, including gallium, hydrogen, helium, argon, carbon, oxygen, and xenon ions. The present invention also relates to a field emission cathode comprising carbon nanotubes, wherein the nanotubes have been treated with an ion beam. A method for treating the carbon nanotubes and for creating a field emission cathode is also disclosed. A field emission display device containing carbon nanotube which have been treated with an ion beam is further disclosed.

13 Claims, 11 Drawing Sheets

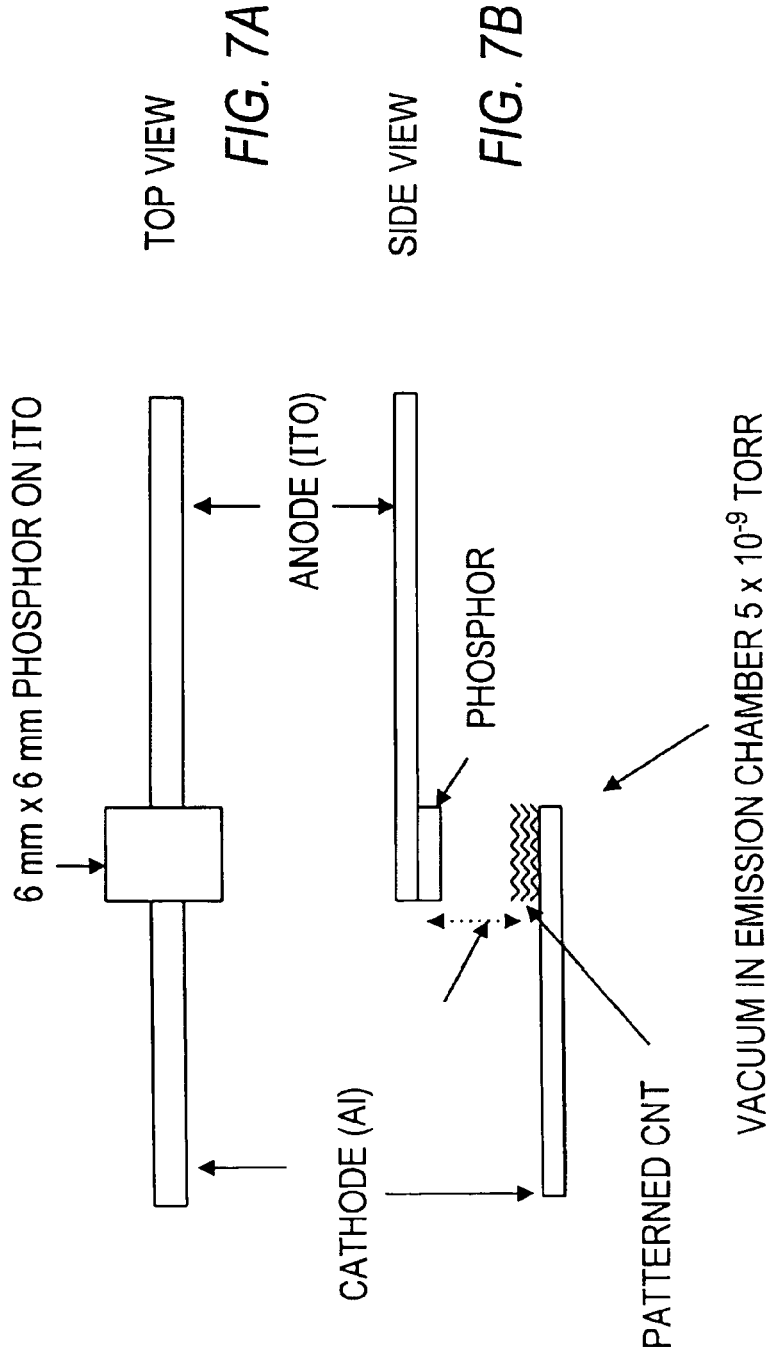

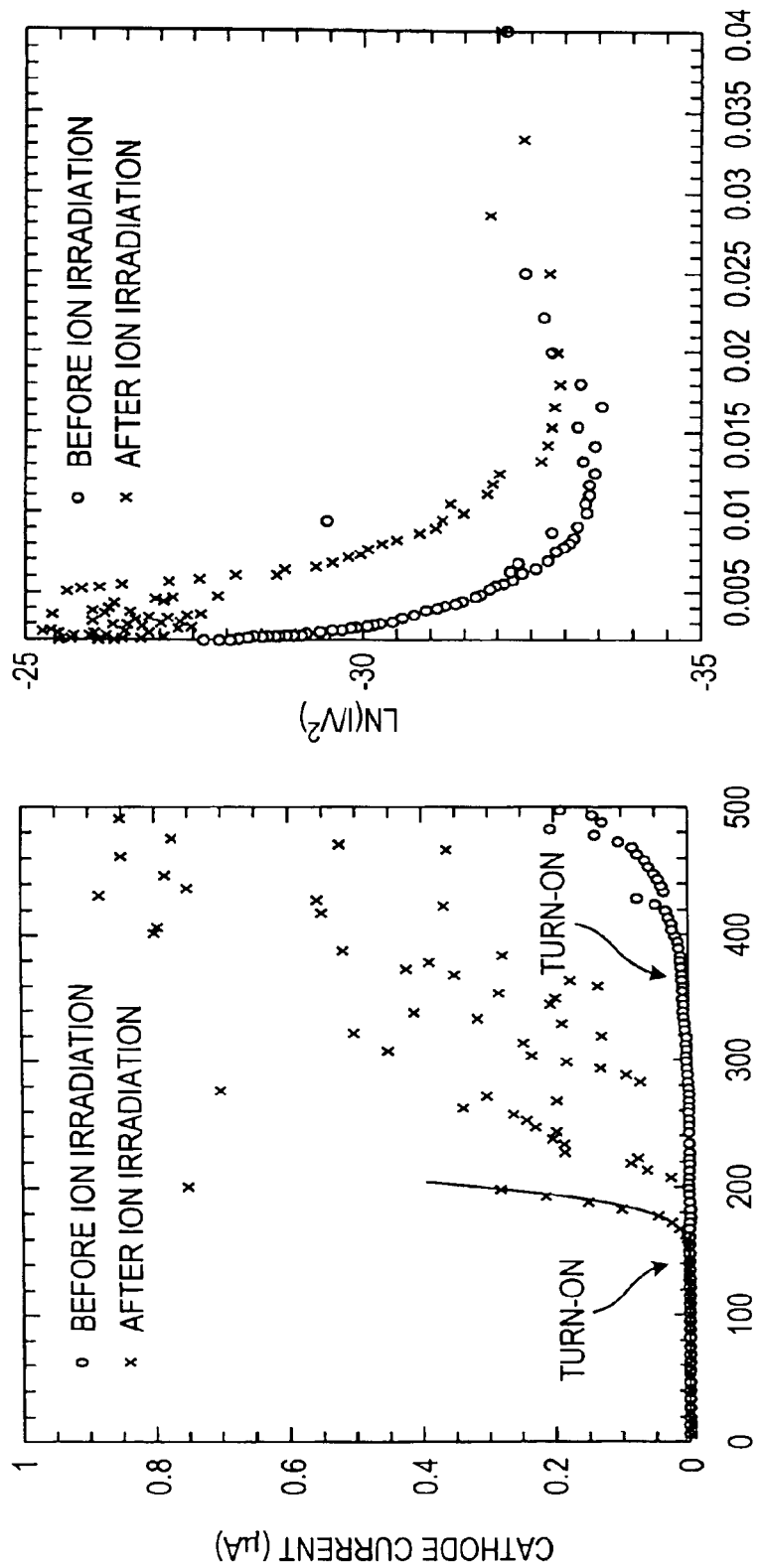

FED WITH CARBON NANO TUBES
MULTI-WALL CNT (MWCNT)
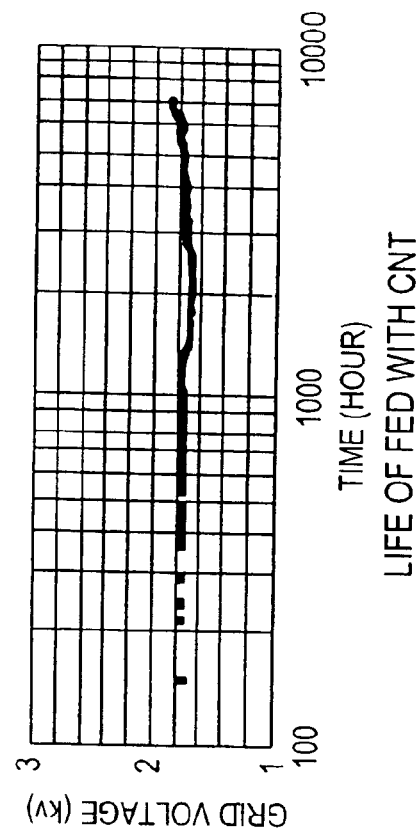
LIFE OF FED WITH CNT
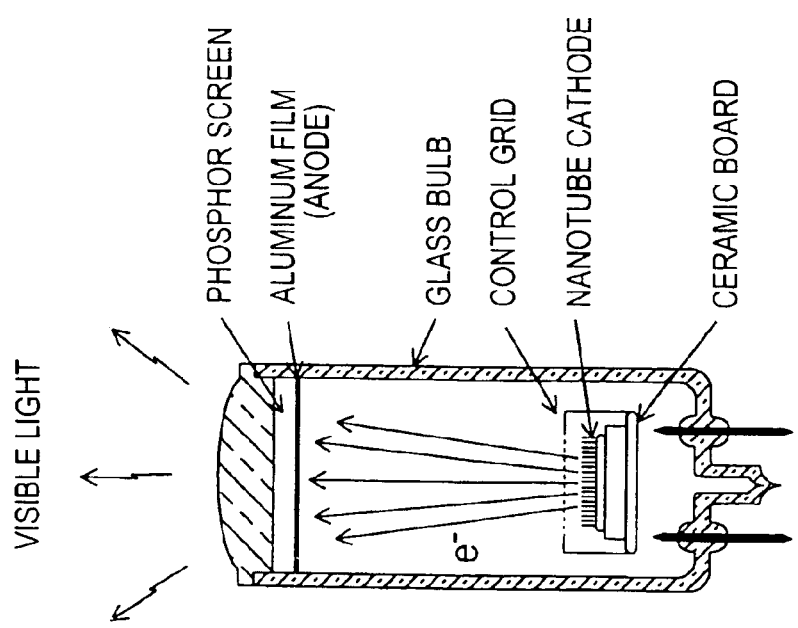
FIG. 11

SEM VIEWS OF CNT ON A1
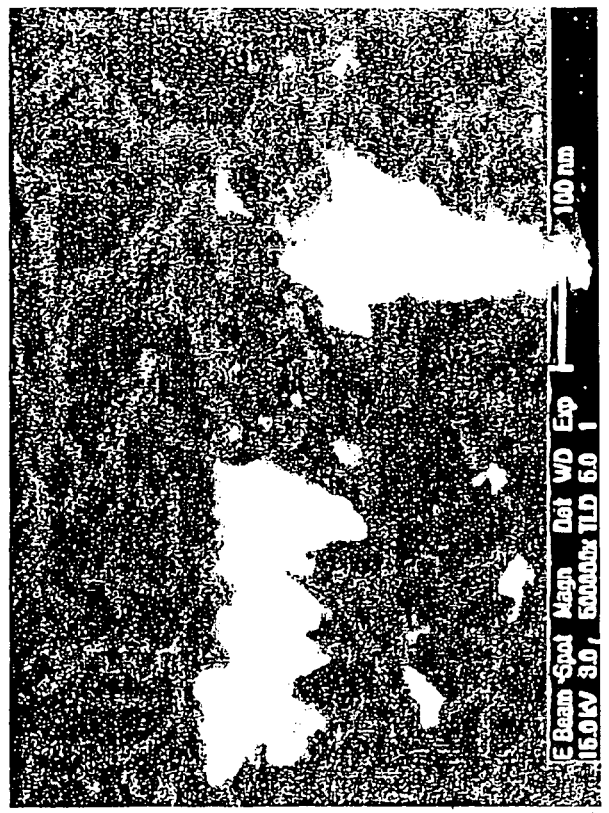
X 500,000
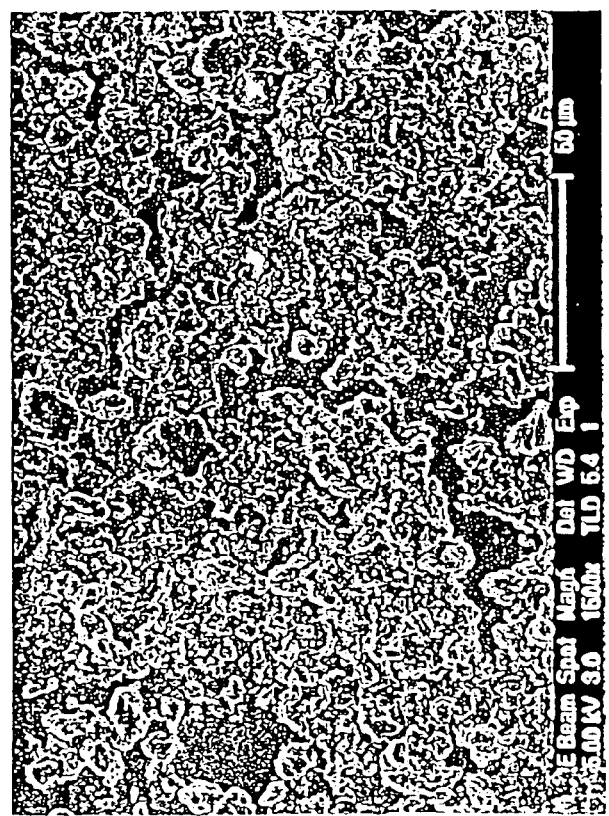
X 1,500
FIG. 12

FIELD EMISSION DEVICES USING ION BOMBARDED CARBON NANOTUBES

This application claims the benefit of U.S. Provisional Application No. 60/298,228, filed Jun. 14, 2001, hereby incorporated by reference.

FIELD OF INVENTION

The present invention relates to field emission cathodes which use carbon nanotubes.

BACKGROUND OF THE INVENTION

Field emission devices are devices that capitalize on the movement of electrons. A typical field emission device includes at least a cathode, emitter tips, and an anode spaced from the cathode. A voltage is applied between the cathode and the anode causing electrons to be emitted from the emitter tips. The electrons travel in the direction from the cathode to the anode.

These devices can be used in a variety of applications including, but not limited to, microwave vacuum tube devices, power amplifiers, ion guns, high energy accelerators, free electron lasers, and electron microscopes, and in particular, flat panel displays. Flat panel displays can be used as replacements for conventional cathode ray tubes. Thus, they have application in television and computer monitors.

Conventional emitter tips are made of metal, such as molybdenum, or a semiconductor such as silicon. The problem with metal emitter tips is that the control voltage required for emission is relatively high, e.g., around 100 V. Moreover, these emitter tips lack uniformity resulting in non-uniform current density between pixels.

More recently, carbon materials, have been used as emitter tips. Diamond has negative or low electron affinity on its hydrogen-terminated surfaces. Diamond tips, however, have a tendency for graphitization at increased emission currents, especially at currents about thirty $mA/cm^2$. Carbon nanotubes, also known as carbon fibrils, have been the latest advancement in emitter tip technology. Although much work has been done in the area of carbon nanotubes as emitter tips in field emitting technologies, substantial improvement is still needed, specifically, in three areas. These areas are reducing work voltage, increasing emission current, and increasing emission sites.

Reducing the work voltage increases the ease of electron emission and also increases the longevity of the emitter tips. Increasing both the emission current and the number of emission sites increase the brightness.

OBJECTS OF THE INVENTION

It is an object of the present invention to provide an improved field emission cathode that features treated carbon nanotubes as the emitters by reducing work voltage, increasing emission, and increasing emission sites. It is a further object of this invention to provide improved field emission cathodes where the emitters comprise treated carbon nanotubes.

It is yet a further object of this invention to provide methods for manufacturing improved field emission cathodes by screen or ink-jet printing of substrates with inks containing treated or untreated carbon nanotubes.

It is still a further object of this invention to provide improved field emission display devices having improved properties such as reduced working voltage, increased emissions and more emission sites.

SUMMARY OF THE INVENTION

The present invention relates to a field emission cathode comprising carbon nanotubes, wherein the nanotubes have been treated with an ion beam. The carbon nanotubes may form the cathode or may be deposited onto a substrate to form the cathode.

This invention also relates to a field emission device comprising an anode and a cathode, wherein said cathode includes carbon nanotubes which have been treated with an ion beam.

In one embodiment, the field emission device comprises a substrate, a porous top layer positioned on said substrate, a catalyst material positioned on said layer; and a cathode positioned on said catalyst material, said cathode including a bundle of carbon nanotubes which have been treated with an ion beam.

The present invention also includes various field emission display devices. In one embodiment, the field emission display device comprises a first substrate, a first metal film on said first substrate; a conductive polymer film on said first metal film, said conductive polymer film including emitter tips comprising carbon nanotubes which have been treated with an ion beam; a dielectric film on said first metal film; a second metal film on said dielectric film; a spacer; a transparent electrode separated from said second metal film by said spacer; a fluorescent material on one side of said transparent electrode; a second substrate on the other side of said transparent electrode; and a power supply.

In an alternative embodiment, the field emission display device comprises a cathode including carbon nanotubes which have been treated with an ion beam; an insulating layer on said cathode; a gate electrode on said insulating layer; an anode spaced from said cathode comprising a phosphor layer, an anode conducting layer, and a transparent insulating substrate; and a power supply.

The carbon nanotubes may be substantially cylindrical carbon fibrils having one or more graphitic layer concentric with their cylindrical axes, said carbon fibrils being substantially free of pyrolytically deposited carbon overcoat, having a substantially uniform diameter between 1 nm and 100 nm and having a length to diameter ratio greater than 5. The carbon nanotubes may also be in form of aggregates such as cotton candy aggregates or bird nest aggregates.

The ion beam treatment may be with ions, including gallium, hydrogen, helium, argon, carbon, oxygen, and xenon ions. The cathode may further include a binder such as a conductive carbon paste or a conductive metal paste.

The field emission cathode may be formed by dispersing carbon nanotubes into a liquid vehicle to form a solution; transferring said solution to an electrophoresis bath, said bath including an anode and a cathode immersed therein; applying a voltage to said anode and said cathode, thereby causing said carbon nanotubes to deposit onto said cathode; removing said cathode from said bath; heating said cathode; and bombarding said cathode with ions.

BRIEF DESCRIPTION OF THE DRAWINGS

The accompanying drawings illustrate an exemplary embodiment of the present invention.

FIG. 7 illustrates a schematic to measure the differences between treated (ion-bombarded) and untreated field emission characteristics;

FIG. 8 is a plot showing cathode current as a function of voltage for ion-bombarded carbon nanotubes versus untreated nanotubes in a field emission device;

FIG. 9 is a Fowler-Nordheim plot for ion-bombarded carbon nanotubes and untreated nanotubes in a field emission device.

FIG. 11 illustrates a field emitting device using ion bombarded carbon nanotubes;

FIG. 12 is a SEM view of the carbon nanotubes on an aluminum substrate.

DETAILED DESCRIPTION OF THE INVENTION

Figure 1:
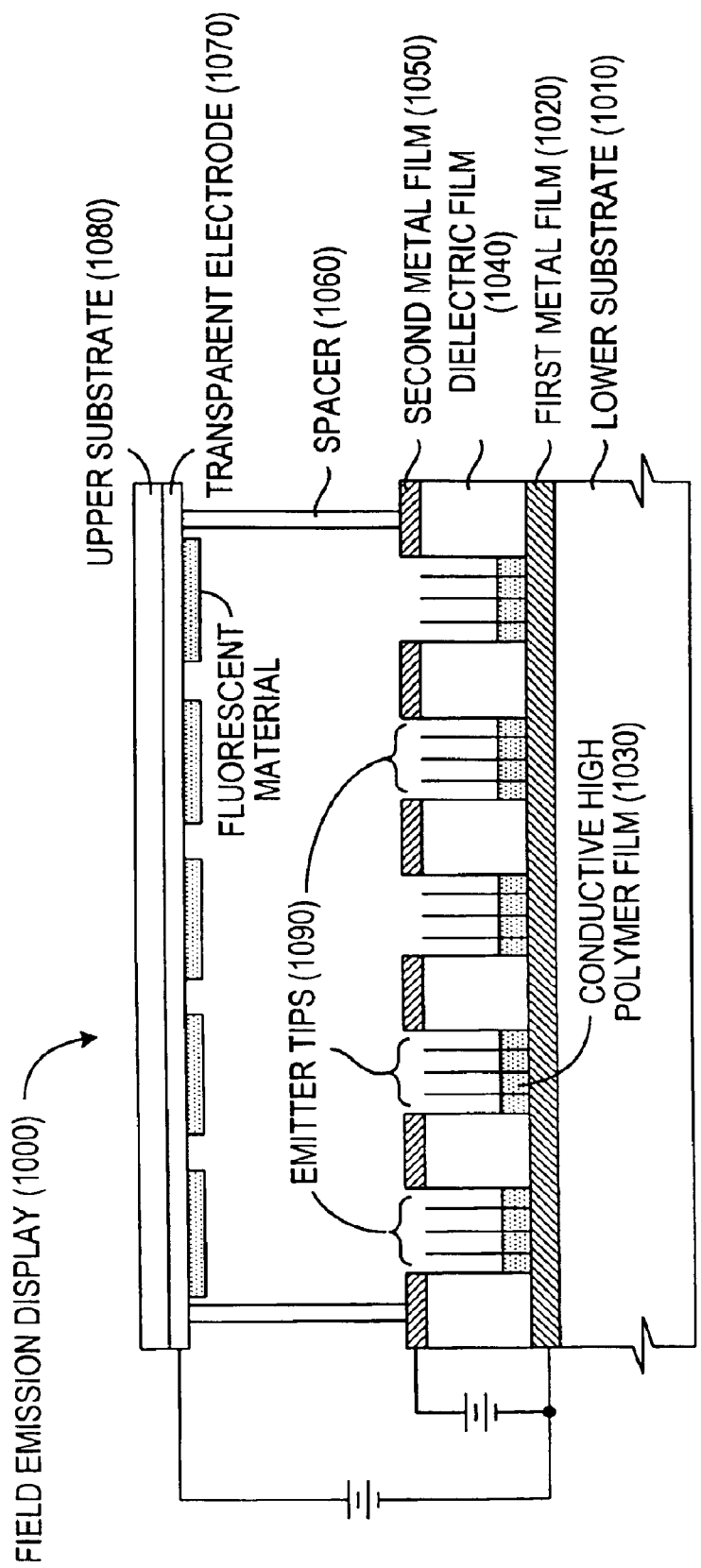
FIG. 1 is a cross-sectional view of a field emission display device using ion-bombarded carbon nanotube cathode according to an exemplary embodiment of the present invention.

All referenced patents, patent applications, and publications are incorporated by reference herein.

Definitions

"Aggregate" refers to a microscopic particulate structures of nanotubes.

"Assemblage" refers to nanotube structures having relatively or substantially uniform physical properties along at least one dimensional axis and desirably having relatively or substantially uniform physical properties in one or more planes within the assemblage, i.e. having isotropic physical properties in that plane. The assemblage can comprise uniformly dispersed individual interconnected nanotubes or a mass of connected aggregates of nanotubes. In other embodiments, the entire assemblage is relatively or substantially isotropic with respect to one or more of its physical properties.

"Carbon fibril-based ink" refers to an electroconductive composite in which the electroconductive filler is carbon fibrils.

"Graphenic" carbon is a form of carbon whose carbon atoms are each linked to three other carbon atoms in an essentially planar layer forming hexagonal fused rings. The layers are platelets having only a few rings in their diameter or ribbons having many rings in their length but only a few rings in their width.

"Graphenic analogue" refers to a structure which is incorporated in a graphenic surface.

"Graphitic" carbon consists of layers which are essentially parallel to one another and no more than 3.6 angstroms apart.

"Nanotube", "nanofiber" and "fibril" are used interchangeably. Each refers to an elongated hollow carbon structure having a diameter less than 1 µm. The term "nanotube" also includes "bucky tubes" and graphitic nanofibers in which the graphene planes are oriented in herring bone pattern.

The terms "emitter tips" and "emitters" are interchangeable. The use of the word "tip" is not meant to limit the emission of the electrons only to the tips of the carbon nanotubes. The electrons can be emitted from any part of the carbon nanotubes.

Carbon Nanotubes

Carbon nanotubes (CNTs) are vermicular carbon deposits having diameters of less than five hundred nanometers. They exist in a variety of forms, and have been prepared through the catalytic decomposition of various carbon-containing gases at metal surfaces, by high temperature carbon arc processes, where solid carbon is used as the carbon feed stock, and by simultaneous laser vaporization of graphite rods and a transition metal. Tennent, U.S. Pat. No. 4,663,230, succeeded in growing small diameter nanotubes having cylindrical ordered graphite cores and an ordered "as grown" graphitic surface uncontaminated with pyrolytic carbon. Tennent, describes carbon nanotubes that are free of a continuous thermal carbon overcoat and have multiple graphitic outer layers that are substantially parallel to the fibril axis. As such they may be characterized as having their c-axes, the axes which are perpendicular to the tangents of the curved layers of graphite, substantially perpendicular to their cylindrical axes. They generally have diameters no greater than 0.1 micron and length to diameter ratios of at least five. Such nanotubes having graphitic layers that are substantially parallel to the fibril axis and diameters between 3.5 and 75 nanometers, are described in Tennent et al., U.S. Pat. No. 5,165,909 and Tennent et al, U.S. Pat. No. 5,171,560.

The graphitic planes may also be oriented at an angle to the fibril axis. Such structures are often called "fishbone" fibrils or nanotubes because of the appearance of the two dimensional projection of the planes. Such morphologies and methods for their production are discussed in U.S. Pat. No. 4,855,091 to Geus, hereby incorporated by reference.

Assemblages and composites consisting of multiwall nanotubes have been described in Tennent et al, U.S. Pat. No. 5,691,054. Such assemblages and composites are composed of randomly oriented carbon fibrils having relatively uniform physical properties. Furthermore, these multiwall nanotubes are substantially free of pyrolytically deposited carbon.

The carbon nanotubes disclosed in U.S. Pat. Nos. 4,663,230, 5,165,909, and 5,171,560, may have diameters that range from about 3.5 nm to 70 nm and lengths greater than 100 times the diameters, an outer region of multiple essentially continuous layers of ordered carbon atoms and a distinct inner core region. Simply for illustrative purposes, a typical diameter for a carbon fibril may be approximately between about 7 and 25 nm, and a typical range of lengths may be 1 µm to 10 µm.

As disclosed in U.S. Pat. No. 5,110,693 and references therein, two or more individual carbon fibrils may form microscopic aggregates of entangled fibrils. These aggregates can have dimensions ranging from 5 nm to several cm. Simply for illustrative purposes, one type of microscopic aggregate ("cotton candy or CC") resembles a spindle or rod of entangled fibers with a diameter that may range from 5 nm to 20 µm with a length that may range from 0.1 µm to 1000 µm. Again for illustrative purposes, another type of microscopic aggregate of fibrils ("birds nest, or BN") can be roughly spherical with a diameter that may range from 0.1 µm to 1000 µm. Larger aggregates of each type (CC and/or BN) or mixtures of each can be formed.

Recently carbon nanotubes having a single wall comprising graphite have been produced. These single wall carbon nanotubes have been described in Bethune et al., U.S. Pat. No. 5,424,054; Guo, et al., Chem. Physics Lett., 243:1–12 (1995); Thess, et al, Science, 273:483–487 (1996); Journet et al., Nature 388 (1997) 756; Vigolo, et al., Science 290 (2000) 1331. They are also described in U.S. patent application Ser. No. 08/687,665, entitled "Ropes of Single-Walled Carbon Nanotubes" herein incorporated by reference.

Additional methods of producing single wall nanotubes production have been described in PCT Application No. PCT/US99/25702 and PCT Application No. PCT US98/16071 herein incorporated by reference.

Single wall nanotubes are useful in a variety of applications. The tubular structure imparts superior strength, low weight, stability, flexibility, thermal conductivity, large surface area and a host of electronic properties. They can be used as reinforcements in fiber reinforced composite structures or hybrid composite structures, i.e., composites containing reinforcements such as continuous fibers in addition to single wall nanotubes.

The improved field emission nanotubes may either be multi-walled or single-walled nanotubes.

Preparation of Films Containing Carbon Nanotubes

The carbon nanotubes used were obtained from Hyperion Catalysis International, Cambridge Mass. They had the designations #1100 and #1100 L. Sample #1100 L comprised carbon nanotubes having a so-called BN macromorphology that had been ball milled in a Red Devil Shaking Ball Mill for approximately four hours. Some samples were treated with an acid wash of twelve grams of $H_3PO_4$ in 1.5 liters of water at atmospheric reflux before ball milling. The carbon nanotubes were dried in an oven before ball milling.

The Solution of Nanotubes

The nanotubes were dispersed by known methods in a suitable solvent as is well known in the art, e.g. isopropyl alcohol.

The Substrate

Aluminum substrates were prepared by vapor depositing aluminum onto glass flats that were approximately 55 mm×45 mm×1 mm in its dimensions. Aluminum adhesion may be enhanced with the addition of an underlying vapor deposited adhesion layer. A dielectric mask can be applied to pattern the aluminum surface into a plurality of electodes prior to nanotube deposition.

The aluminum can also be pretreated to promote the adhesion of the carbon nanotubes. This can be done with any known pretreatments of aluminum. The carbon nanotubes can also adhere to other substrates, e.g., $SnO_2$-in/Sb

The Electrophoresis Bath

The elecrophorectic deposition of the carbon nanotubes was conducted in an electrophoresis bath. The bath consists of a chamber to contain the solution of carbon nanotubes and means for immersing two opposing electrodes separated by some distance with the carbon nanotubes between the opposing electrodes. A DC power supply, external to the bath, is used to apply a voltage between the two electrodes immersed in the bath. The cathode lead is connected to the patterned aluminum substrate and the anode lead is connected to the other electrode. Tantalum was used for the second metal. The voltage applied to the two electrodes can be adjusted to a suitable level or the voltage can be adjusted to obtain a suitable current between the two electrodes.

The attachment of carbon nanotubes to the aluminum can be enhanced by a binder. The binders can be a mixture of Ag paste, carbon nanotubes and ethanol. Or the binders can be a carbon paste, a conductive metal paste or a carbonizable polymer.

Electrophoretic Deposition of Carbon Nanotubes on the Substrate

A field emitter substrate is loaded into the electrophoresis bath. A plurality of cathodes are arranged on a glass substrate, and a dielectric film is formed with holes over the cathodes. Metal gates with openings which are located over the holes of the dielectric film are formed to expose the surface of the cathodes. Then, the carbon nanotubes are uniformly deposited onto the obtained substrate, on the surface of the cathodes exposed through the holes by electrophoretic deposition at room temperature.

Post Deposition Heat Treatment

After the deposition of carbon nanotube particles by electrophoresis, low-temperature heating is performed to sustain the deposition of the carbon nanotubes on the cathodes and ensure easy removal of impurities which are incorporated into the field emitter during the deposition.

EXAMPLE I

Preparation of Nanotube Film on Aluminum Substrate

Figure 5:
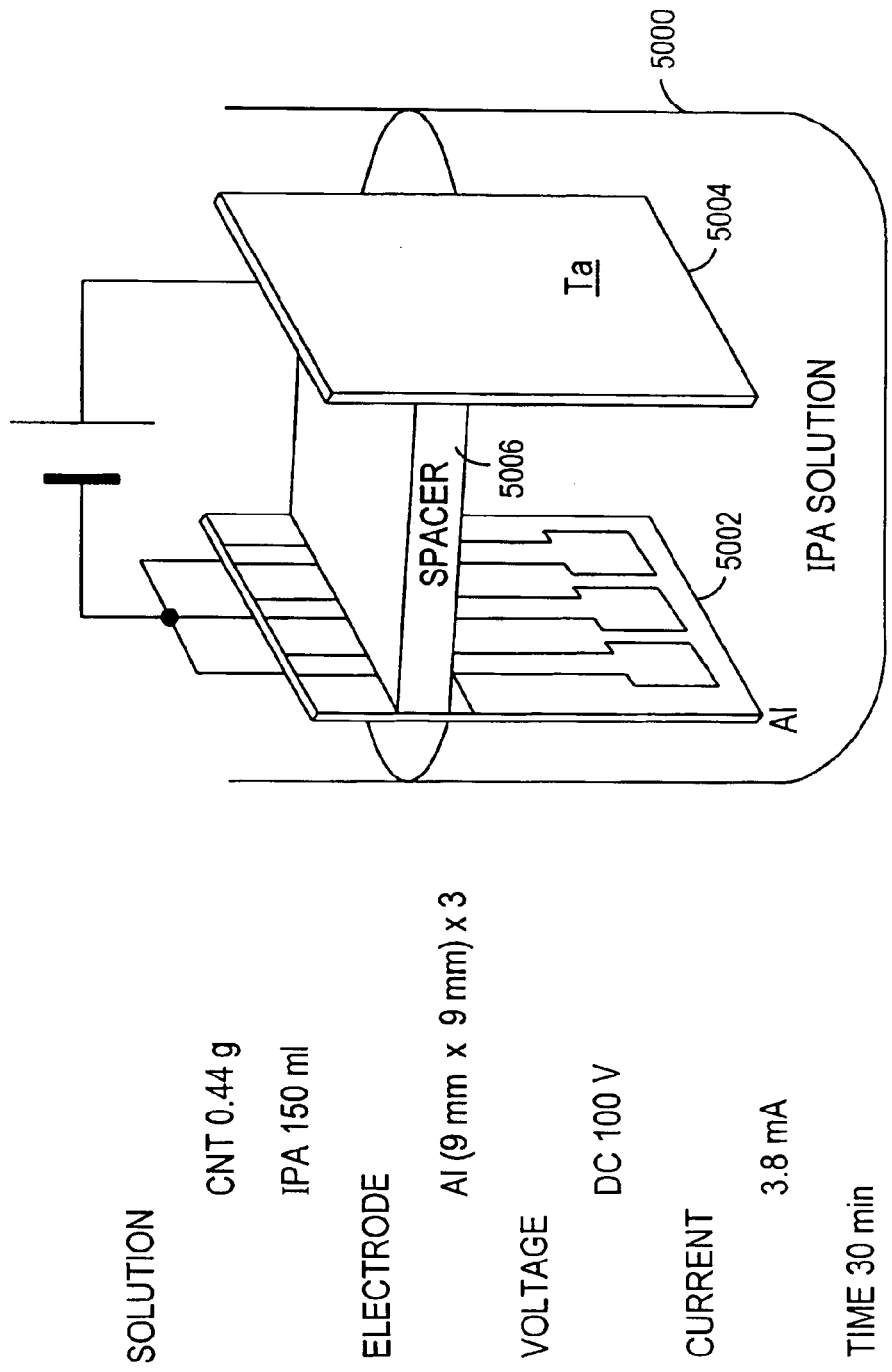
FIG. 5 illustrates an electrophoresis bath used to fabricate a carbon nanotube film (electrode)

With reference to FIG. 5, a solution is formed that contains 150 ml and 0.44 grams of acid washed carbon nanotubes. This solution is placed in an electrophoresis bath 5000.

An aluminum coated glass 5002 (patterned) serves as one electrode in electrophoresis bath 5000. The pattern forms the pixel size. The smallest feature size can be ca. 1 micron. The aluminum coated glass 5002 is about 55 mm×45 mm×1 mm in its dimensions. The aluminum pattern size is about 9 mm×9 mm. The other electrode, tantalum (Ta) electrode 5004 is also inserted into the electrophoresis bath 5000. A spacer 5006 separates the aluminum coated glass 5002 from the tantalum electrode 5004. A DC voltage for example between 40 through 120 volts, e.g., 100 volts is applied to the electrodes. A current between 1.0 through 5 mA, e.g., 3.8 mA is applied to the electrodes. The duration of the preparation time can be between about 30 to about 90 minutes, e.g., 60 minutes.

Figure 6:
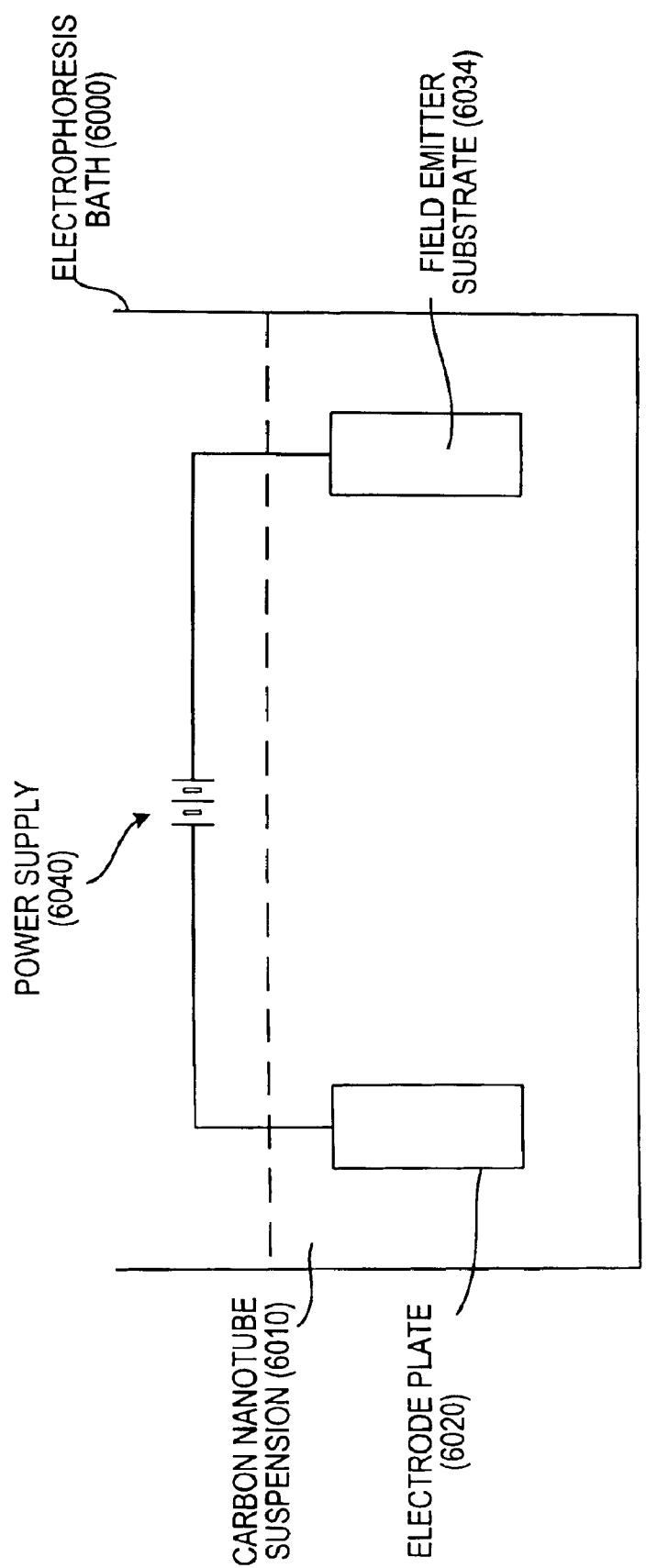
FIG. 6 illustrates another electrophoresis bath used to fabricate a carbon nanotube film (electrode)

FIG. 6 illustrates an alternative electrophoretic method of creating the film according to the method disclosed in UK patent application 2,353,138 described below. First, a carbon nanotube suspension is created. The carbon nanotube particles can have lengths from about 0.1 to about 1 µm. The suspension can also include a surfactant, e.g., an anionic, ionic, amphoteric or nonionic, or other surfactant known in the art. Examples of suitable surfactants include octoxynol, bis(1-ethylhexyl)sodium sulfosuccinate, and nitrates of $Mg(OH)_2$, $Al(OH)_3$ and $La(OH)_3$.

The suspension is then sonicated to charge the carbon nanotube particles. The intensity of the electric field and the time for which the electric field is applied define the thickness of the carbon nanotube layer. Greater intensity and longer time yield thicker layers.

With reference to FIG. 6, the field emitter substrate 6030 is loaded into the electrophoresis bath 6000 containing a carbon nanotube suspension 6010. An electrode plate 6020 is also installed in the electrophoresis bath 6000 spaced apart from the field emitter substrate 6030. The cathode of a DC power supply 6040, which is installed outside of the electrophoresis bath 6000, is connected to the cathodes of the field emitter substrate 6030 and the anode of the DC power supply 6040 is connected to the electrode plate 6020. Then, a bias voltage of about 1 to about 1000 volts is applied from the DC power supply 6040 between the electrode plate 6020 and the cathodes of the field emitter substrate 6030.

A positive voltage of the DC power supply 6040 is applied to the electrode plate 6020, carbon nanotube particles charged by positive ions in the carbon nanotube suspension 6010 migrate to and are attached to the exposed cathodes of the field emitter substrate 6030, which results in the formation of a carbon nanotube film.

As for the height and thickness of the film, also known as the ink, coating, or paste, a space which isolates carbon nanotube cathodes and the anode with indium tin oxide and phosphor is about 125 microns. The height of printed carbon nanotubes may be less than 10 microns.

The electrophoresis process can be applied to both diodes and triodes. For applications to a diode, an electric field having opposite charges to those on the surfaces of the carbon nanotube particles is applied to exposed electrode surface of a field emitter substrate for selective deposition of carbon nanotube particles thereon. For application to a triode having gates, a weak positive electric field is applied to the gates while a positive electric field is applied to the electrodes of the field emitter substrate, which avoids deposition of carbon nanotube particles on the gates. In particular, the electrode plate is connected to the anode of the DC power supply, and the cathodes of the field emitter substrate are connected to the cathode of the DC power supply. As a positive potential is applied to the gates, the gates repel positive ions in the carbon nanotube suspension at the surface, while the exposed cathodes of the field emitter substrate, which are connected to the cathode of the DC power supply pull positive ions of the suspension through the holes. As a result, the carbon nanotubes are deposited only on the entire exposed surface of the cathodes, not on the gates of the field emitter substrate. At this time, carbon nanotube particles are attracted to the field emitter substrate and are oriented substantially horizontal, or substantially parallel to the substrate, which allows the carbon nanotube particles to smoothly migrate through the holes to the cathodes, and thus the carbon nanotubes can be deposited.

The film can also be prepared similarly to the carbon ink disclosed in European Patent Application EP 1 020 888 A1—Carbon ink, electron-emitting element, method for manufacturing and electron-emitting element and image display device.

Ion Bombardment of Carbon Nanotube Films

Carbon nanotubes films are treated by ion bombardment before use in a field emission device or field emitting cathode.

The settings used to bombard the carbon nanotubes were as follows:

energy: 30 keV. Other ranges appropriate for the present invention can be from about 5 eV to about 1 MeV, e.g., 10–50 keV.

ion: Ga. Although Ga was used as the ion, any type of ion can be used. Other types of ions, for example, include H, He, Ar, C, O, and Xe.

spot size: defocused, 500 nm. Other ranges appropriate for the present invention include from about 1 nm to about 1 micron. Appropriate spot size can also be based on desired resolution and dose.

scan area: 760 microns×946 microns Rasterscanned for about twenty seconds. Any appropriate scan area will suffice.

dose: $2\times10^{14}/cm^2$ ranges include from about $10^2/cm^2$ to about $10^{20}/cm^2$

Characterization of the Ion Bombarded Film

By viewing samples in a SEM, it is possible to detect irradiated areas by contrast change, i.e., dark image. FIG. 12 illustrates scanning electron microscope views of carbon nanotubes on aluminum.

FIG. 7 schematically illustrates an apparatus used to make the emission measurements. FIG. 7 illustrates the top view, FIG. 7a, and side views, FIG. 7b. FIG. 7a shows a 6 mm×6 mm phosphor on indium tin oxide (ITO). In FIG. 7b, the phosphor is shown to be spaced from the patterned carbon nanotubes by a distance of 125 µm. The entire system is evacuated with a vacuum of $5\times10^{-9}$ Torr in the emission chamber.

The degree of improvements achieved by ion beam treatment are summarized in Table 1:

TABLE 1

|  | Untreated CNT Cathode | Ion-Bombarded CNT Cathode |
|---|---|---|
| Threshold voltage | 350 Volts | 140 Volts |
| Threshold Field | 2.8 V/µm | 1.1 V/µm |
| Emission current | see FIG. 8 | 6 times increase |

The ion bombardment achieves a reduction in work voltage, increases emission current and increases the number of emission sites. With reference to FIG. 8, it is seen that the turn-on voltage was reduced substantially as the result of ion beam treatment.

FIG. 9 is a Fowler-Nordheim (F-N) plot. The shape of the curves provide the theoretical proof of FE. Shifting the curve toward the right side—toward lower voltage—indicates an increased number of emission sites.

EXAMPLE II

Emission Characteristics of Ion-Beam-Treated Nanotube Films

Carbon nanotube films fabricated by electrophoresis on an aluminum layer deposited on a glass have been locally irradiated with focused ion beams. A diode structure with a distance of 125 µm between cathodes and anodes was used for emission measurement. A maximum emission current of 375 microamps with a turn-on voltage of 2.8 V/µm for carbon nanotube emitters was found to decrease by focused ion beam irradiation to 1.1 V/µm with increase in emission current by a factor of six.

The current range that was used in the test was in the low range with an anode voltage of about 400 to 500 volts, close to the turn-on (threshold) voltage for field emission. The change was from 0.05 to about 0.18 microamps to more than 0.9 microamps with a drastic change in the F-N plot shown in FIG. 9.

The physical and chemical effects of ion bombardment on carbon nanotubes are not entirely known. While not wishing to be bound to any particular theory, it may be that the effect of the ion bombardment is the creation of surface sites which enhance field emission. It is believed that the treatment 1) cuts lengths of nanotubes, in particular, if high energy beams are used, hence generating more ends; 2) implants ions, like Ga ions, into the nanotube film, the ions being inside a single tube and outside tubes; 3) saturates dangling bonds with hydrogen (where a hydrogen ion beam/plasma is used), resulting in hydrogenated surface; 4) cleans the surface of nanotubes by removing contaminants, such as binder residue and oxygenated groups; 5) generates localized and delocalized regions along the nanotube axis by creating pits and carbon nanoparticles and recrystallizing amorphous carbons on the surface of nanotubes, and disrupting carbon layers, leading to an increasing in emission sites; 6) improves electric contacts between nanotubes.

The surface sites generated by ion bombardment can be defects, which are carbon atoms at edges, carbon atoms associated with other atoms, like a hydrogen atom, and an implanted Ga atom, and carbon atoms with a sp3 configuration or configurations between sp2 and sp3. The defects can be at the ends (exposed) of a nanotube, and on the surface of a single nanotube associated with a nanoparticle, a pit and a disrupted carbon layer.

Construction of a Field Emission Display Device Using Ion Bombarded Carbon Nanotube Cathode Generally, field emission display devices are based on the emission of electrons in a vacuum. Emitter tips emit electrons that are accelerated in a strong electric field. The electrons ultimately collide with fluorescent materials that emit light. The advantages of this type of display over other types, such as cathode ray tubes, are that they are very thin and light and yield high brightness and resolution. Processes for constructing these devices are disclosed in EP No. 1,073,090 A2.

FIG. 1 shows an exemplary embodiment of a field emission display device using an ion bombarded carbon nanotube cathode. The field emission display 1000 includes, for example, a first substrate 1010, first metal film 1020, a conductive high polymer film 1030, a dielectric film 1040, a second metal film 1050, a spacer 1060, a transparent electrode 1070, a second substrate 1080, and emitter tips, the ion bombarded carbon nanotube cathode, 1090.

The substrate 1010 is, for example, made of glass quartz, silicon, or alumina ($Al_2O_3$). Other substrates include silica, platinum, iron and its alloys, cobalt and its alloys, nickel and its alloys, and ceramics.

The first metal film 1020 functions as the cathode and is, for example, made of chrome, titanium, tungsten, or aluminum. The first metal film 1020 has a thickness form about 0.2 to about 0.5 $\mu$m.

On the first metal film 1020 is, for example, the dielectric film 1040. The dielectric film 1040 has a thickness from about one to about five $\mu$m.

On the dielectric film 1040 is the second metal film 1050. The second metal film 1050 functions as a gate electrode and is made from, for example, chrome, titanium, or palladium. The thickness of the second metal film is from about 0.2 to 0.5 $\mu$m. The second metal film 1050 can also be patterned, for example, by using a photoresist film that has a thickness from about 1.5 to about 2.0 $\mu$m. The photoresist film is later developed forming a photoresist pattern. The accelerating gate electrode should be in close proximity to the emitting source approximately one to ten $\mu$m.

Both the first metal film 1020 and the dielectric film 1040 have a plurality of fine holes. The holes have, for example, a diameter of 0.5 to 10.0 $\mu$m and are separated from each other by about 2.0 to about 15.0 $\mu$m.

Formed within the fine holes of the dielectric film 1040 and the second film 1050, is the conductive high polymer film 1030. The conductive high polymer film 1030 can be, for example, made from carbon adhesive or silver adhesive. To attach the conductive high polymer film 1030 to the first metal film 1020, the conductive high polymer film 1030 is liquefied by heating and poured to fill approximately one-third of each of the fine holes.

Arranged vertically or horizontally within the conductive high polymer film 1030 are carbon nanotubes used as emitter tips 1090. The emitter tips 1090 are made from the ion bombarded carbon nanotubes discussed previously. These emitter tips 1090 can obtain a great amount of emission current at a low operating voltage, for example, about 1.5 V/$\mu$m. The range can be from about 0.1 to about 2.0 V/$\mu$m, e.g., about 0.8 V/$\mu$m to about 1.5 V/$\mu$m.

Above the second metal film 1050 is the spacer 1060. The spacer 1060 is installed to about 100 to about 700 $\mu$m. on the second metal film 1050.

The transparent electrode 1070 is on top of the spacer 1060. The transparent electrode 1060 functions as an anode and is made of a conducting oxide, such as indium oxide, indium tin oxide, tin oxide, copper oxide, or zinc oxide.

The second substrate 1080 is on the transparent electrode 1070 and can be made of glass. Fluorescent material, attached to the transparent electrode 1070, emits red, blue, or green light when electrons contact it.

The emitter tips 1090 are made of the ion bombarded carbon nanotubes. The geometrical features of the emitter tips 1090 should be small. For example, the diameters of each emitter tip 1090 should be as small as 1.3 nm. The average height of the nanotubes is from about 0.1 to about 1000 $\mu$m, preferably between 0.1 to about 100 $\mu$m. The average diameter is between 1.3 to 200 nm depending on whether the nanotubes are single walled or multi-walled.

More than $10^4$ emitting tips are needed per pixel of 100×100 $\mu m^2$ assuming 50% of nanotube density with a tubule diameter of about 10 to about 100 nanometers. The emitter density is preferably at 1/$\mu m^2$, in particularly at least 10/$\mu m^2$. The entire field emission display 1000 is evacuated.

Figure 2:
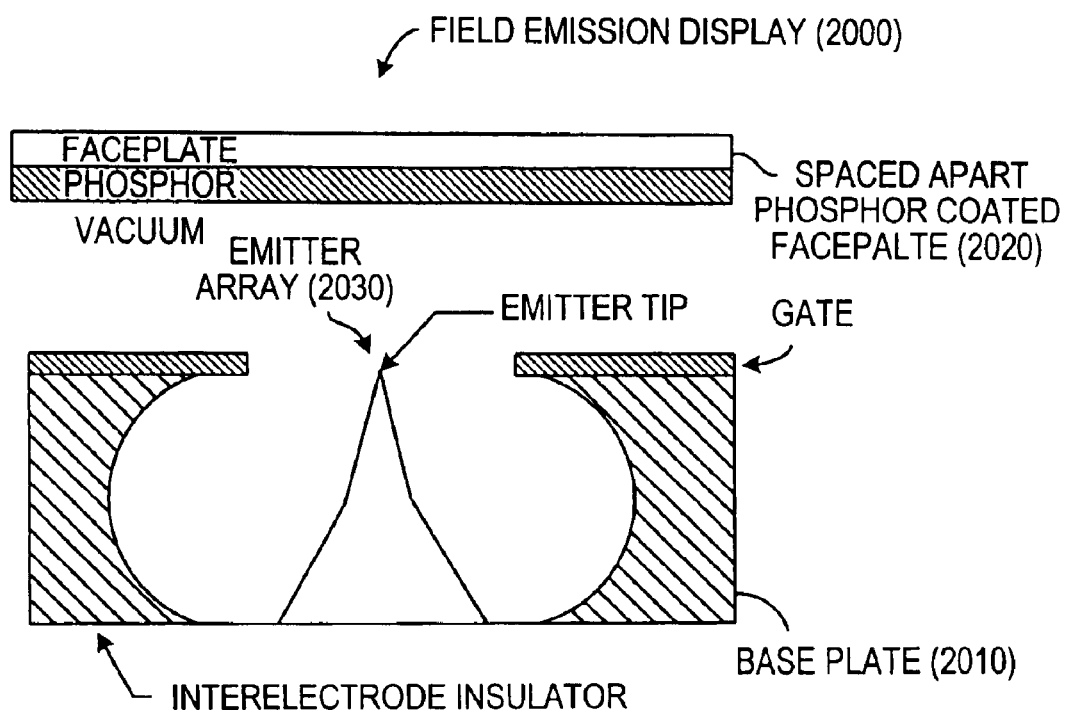
FIG. 2 is a cross-sectional view of a field emission display device using ion-bombarded carbon nanotube cathode according to another exemplary embodiment of the present invention.

In FIG. 2, a field emission display 2000 is shown. The field emission display 2000, includes, for example, a baseplate 2010, a spaced-apart phosphor coated faceplate 2020, and an electron emitter array 2030, made of ion bombarded carbon nanotubes, positioned on the baseplate 2010 for emitting electrons that collide with the phosphor causing illumination. The components of the field emission display 2000 are in a vacuum. The electron emitter array 2030 is composed of ion bombarded carbon nanotubes that can have either an orientation parallel, perpendicular, or any angle between zero and ninety degrees to the baseplate 2010. (See PCT/US 99/13648—Free Standing and Aligned Carbon Nanotubes and Synthesis thereof).

Figure 3:
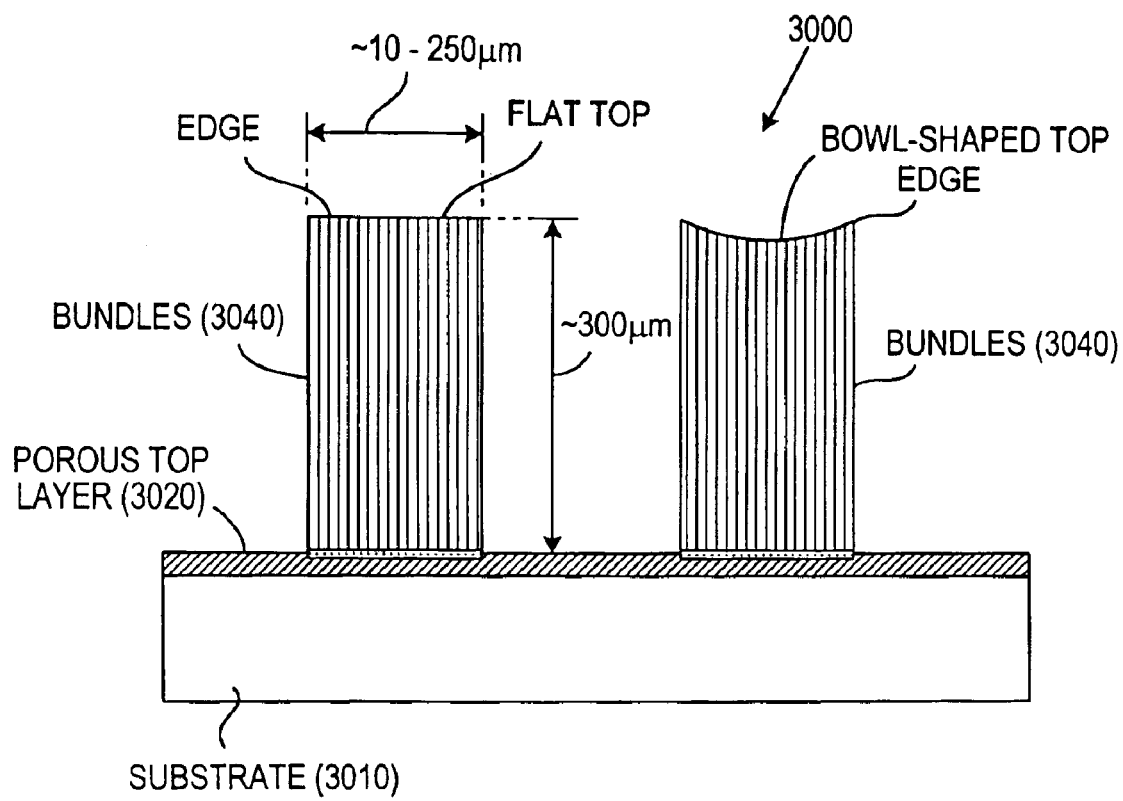
FIG. 3 is a cross-sectional view of a field emission display device using ion-bombarded carbon nanotube cathode according to another exemplary embodiment of the present invention.

FIG. 3 shows yet another embodiment of the field emission device. The device 3000, has, for example, a substrate 3010, a porous top layer 3020, a catalyst material 3030, and bundles of ion bombarded carbon nanotubes 3040 serving as the cathode.

The substrate 3010 and the porous top layer 3020 can be made of, for example, silicon. The catalyst material 3030 can be a thin film of iron oxide that is formed in a particular pattern. The carbon nanotube bundles 3040 serve as emitter tips. The bundles 3040 are oriented substantially perpendicular to the substrate 3010. Alternatively, the bundles 3040 can also be oriented substantially parallel to the substrate 3010.

The carbon nanotube bundles 3040 may be about 10–250 $\mu$m wide, and up to or greater than three hundred $\mu$m in height. The bundles 3040 are of the same size and shape as the patterns of catalyst material 3030, for example. The nanotube bundles 3040 can have flat tops or bowl-shaped tops as shown in the figure. The sharp edges of the nanotube bundles 3040 function as field emission regions. Each bundle 3040 provides the field emission for a single pixel in a flat panel display.

The device is evacuated to from about $10^{-3}$ Torr to about $10^{-9}$ Torr, e.g., from about $10^{-7}$ Torr to about $10^{-8}$ Torr.

The calculation of any electrical field within the device 3000 is made by taking the applied voltage and dividing it by the distance from the emitter tips to the anode. See (PCT appln. PCT/US99/26332)

Figure 4:
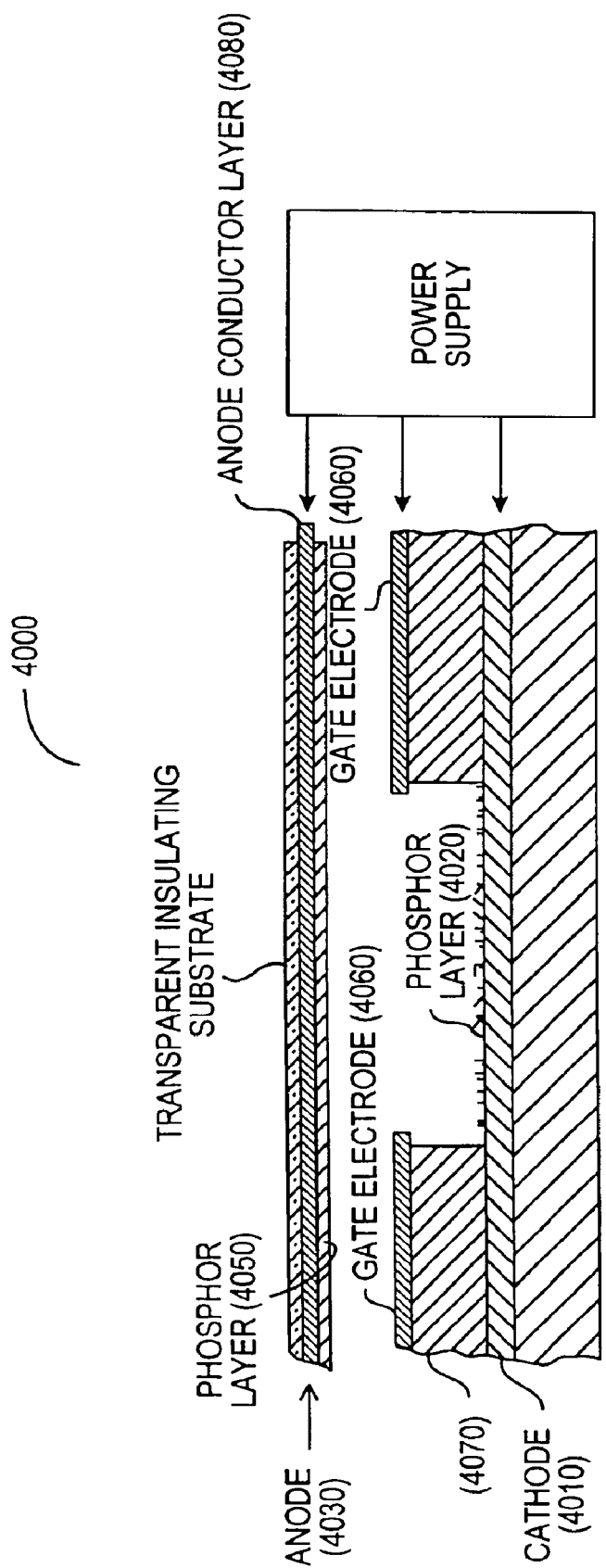
FIG. 4 is a cross-sectional view of a field emission display device using ion-bombarded carbon nanotube cathode according to another exemplary embodiment of the present invention.

FIG. 4 shows another embodiment of a flat panel field emission display 4000. The display 4000, for example, includes cathode 4010 that contains a plurality of ion bombarded carbon nanotube emitting tips 4020 and an anode 4030. The anode 4030 further includes an anode conductor 4040 and a phosphor layer 4050. Between the cathode 4010 and the anode 4030 is a perforated conductive gate electrode 4060. Between the gate electrode 4060 and the cathode 4010 is an insulating layer 4070. The space between the anode 4030 and the carbon nanotube emitting tips are sealed and evacuated. The voltage is supplied by a power supply. The electrons emitted from the emitting tips 4020 are accelerated by the gate electrode 4060, and move toward the anode conductor layer 4080 which is a transparent conductor such as indium-tin oxide. The gate electrode 4060 should be within 10 $\mu$m of the emitting tips 4020. As the emitted electrons hit the phosphor layer 4050, light is given off. (see, EP 1,022,763 A1). The colors of the emitted light depend on the phosphors that are used. For example Zn:Scu, Al for green, $Y_2O_3$:Eu for Red, and ZnS:Ag for blue.

The cathodes and anodes can be referred to as sources and drains respectively.

Operation of a Field Emission Device

To operate the field emission display device, the ion bombarded carbon nanotube cathode is held at a negative potential relative to the anode. As a result of this potential difference, electrons are emitted from the emitter tips and travel to the anode. The gate electrode can be used to accelerate the emitted electrons.

Field Emission Display Devices

Figure 10:
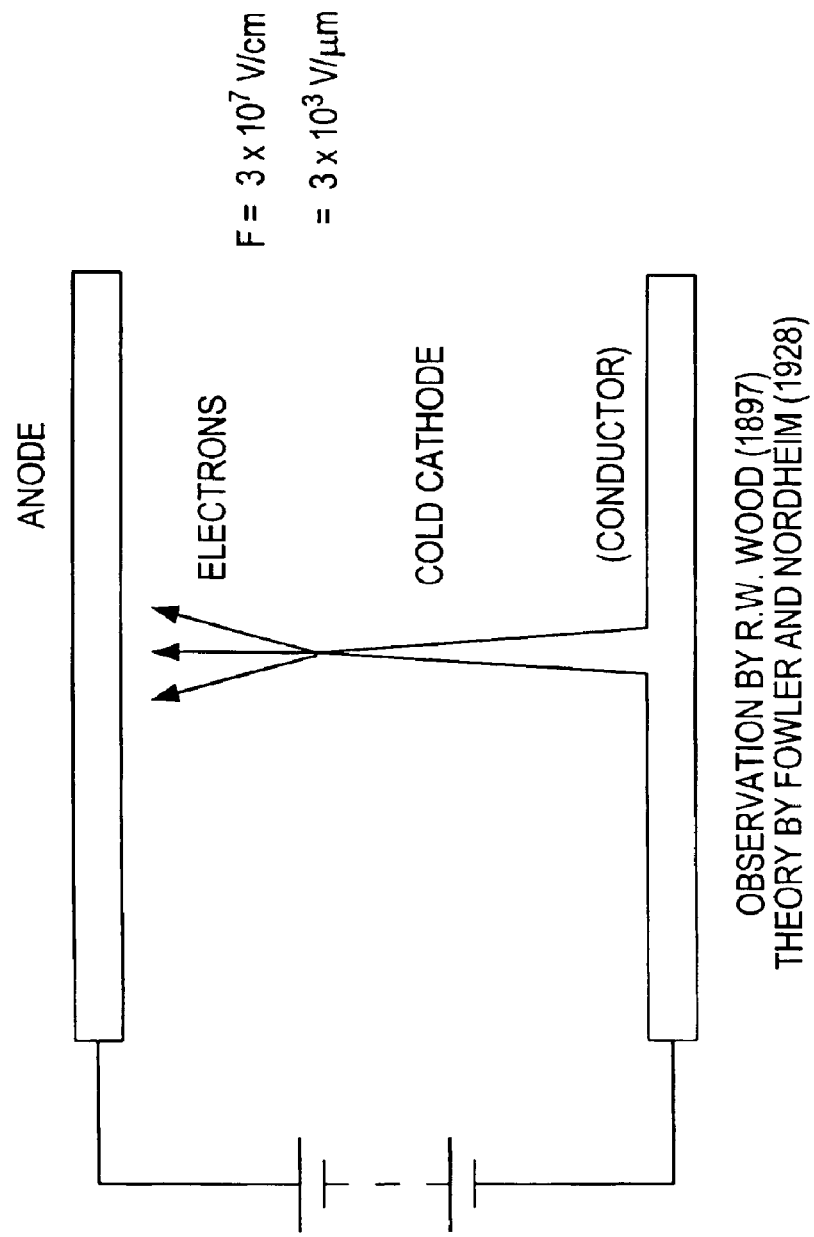
FIG. 10 illustrates a classical field emitter.

Using the ion bombarded carbon nanotube cathode, various devices can be created, such as a field emitter array. An array can include a single nanotube, a single bundle, or many carbon nanotubes and field emission display e.g., a flat panel television. The treated carbon nanotube can constitute the array. FIG. 10 is an illustration of a classical field emitter.

Table 2 shows example characteristics of a field emitter display.

TABLE 2

| | |
|---|---|
| emission type | low & high voltage |
| brightness (cd/m$^2$) | 150, 600 |
| viewing angle (degrees) | 160 |
| emission efficiency (lm | 10–15 |
| response time | 10–30 |
| contrast ratio | >100:1 |
| number of colors | 16 million |
| number of pixels | 640/480 |
| resolution (mm pitch) | 0.31 |
| power consumption (W) | 2 |
| max screen size (cm) | 26.4 |
| panel thickness (mm) | 10 |
| operating temp range (° C.) | −5 to 85 |

The advantages of field emission display over other types of displays such as cathode ray tubes include: high brightness, peak brightness, full viewing angle, high emission efficiency, high dynamic range, fast response time, and low power consumption.

BIBLIOGRAPHY

Use of Carbon Nanotubes in Field Emission Cathodes for Light Sources

PCT Appln. PCT/SE00/015221—A Light Source, and a Field Emission Cathode

PCT Appln. PCT/US99/13648—Free-Standing and Aligned Carbon Nanotubes and Synthesis Thereof (scanning electron microscope, alkali metal batteries, electromagnetic interference shield, and microelectrodes).

[Articles Further Describing the Invention Incorporated Herein by Reference:

Yahachi Saito et al., *Cathode Ray Tube Lighting Elements with Carbon Nanotube Field Emitters*, 37 JAPAN. J. APPLIED PHYSICS 346 (1998).

Yahachi Saito et al., *Field Emission from Multi-Walled Carbon Nanotubes and its Application to Electron Tubes*, 67 APPLIED PHYSICS 95, (1998).

J. D. Carey et al., *Origin of Electric Field Enhancement in Field Emission from Amorphous Carbon Thin Films*, 78 APPLIED PHYSICS LETTERS 2339 (2001).

Kenneth A. Dean et al., *Current Saturation Mechanisms in Carbon Nanotube Field Emitters*, 76 APPLIED PHYSICS LETTERS 375 (2000).

W. Zhu et al., *Low-Field Electron Emission from Undoped Nanostructured Diamond*, 282 SCIENCE 1471 (1998).

L. Nilsson et al., *Carbon Nano-/Micro-Structures in Field Emission: Environmental Stability and Field Enhancement Distribution*, 383 THIN SOLID FILMS 78 (2001).

K. C. Walter et al., *Improved Field Emission of Electrons from Ion Irradiated Carbon*, 71 APPLIED PHYSICS LETTERS 1320 (1997)

S. Dimitrijevic et al., *Electron Emission From Films of Carbon Nanotubes and ta-C Coated Nanotubes*, 75 APPLIED PHYSICS LETTERS 2680 (1999)

A. Wadhawan et al., *Effects of Cs Deposition on the Field-Emission Properties of Single-Walled Carbon-Nanotube Bundles*, 78 APPLIED PHYSICS LETTERS 108 (2001)

O. Yavas et al., *Improvement of Electron Emission of Silicon Field Emitter Arrays by Pulsed Laser Cleaning*, 18 J. VAC. SCI. TECHNOL. B. 1081 (2000)

O. Yavas, et al., *Laser Cleaning of Field Emitter Arrays for Enhanced Electron Emission*, 72 APPLIED PHYSICS LETTERS 2797 (1998)

M. Takai et al., *Effect of Laser Irradiation on Electron Emission from Si Field Emitter Arrays*, 16 J. VAC. SCI. TECHNOL. B. 780 (1998)

M. Takai et al., *Electron Emission from Gated Silicide Field Emitter Arrays*, 16 J. VAC. SCI. TECHNOL. B. 790 (1998).]

M. Takai et al., *Effect of Gas Ambient on Improvement in Emission Behavior of Si Field Emitter Arrays,* 16 J. VAC. SCI. TECHNOL. 799 (1998).

O. Yavas et al., *Field Emitter Array Fabricated Using Focused Ion and Electron Beam Induced Reaction,* 18 J. VAC. SCI. TECHNOL. 976 (2000)

R. Khan et al. *Electron Delocalization in Amorphous Carbon by Ion Implantation,* 63 PHYSICAL REVIEW B 121201-1 (2001)

O. Yavas et al., *Maskless Fabrication of Field-Emitter Array by Focused Ion and Electron Beam,* 76 APPLIED PHYSICS LETTERS 3319 (2000)

A. Seidl et al., *Geometry Effects Arising from Anodization of Field Emitters,* 18 J. VAC. SCI. TECHNOL. B 929 (2000).

O. Yavas et al., *Pulsed Laser Deposition of Diamond Like Carbon Films on Gated Si Field Emitter Arrays for Improved Electron Emission,* 38 JAPAN. J. APPLIED PHYSICS 7208 (1999).

What is claimed is:

1. A field emission device comprising:

a cathode; and an anode spaced from the cathode, wherein said cathode includes emitters comprising carbon nanotubes which have been treated with an ion beam and wherein said nanotubes are substantially cylindrical carbon fibrils having one or more graphitic layers concentric with their cylindrical axes, said carbon fibrils being substantially free of pyrolytically deposited carbon overcoat, having a substantially uniform diameter between 1 nm and 100 nm and having a length to diameter ratio greater than 5.

2. The field emission device of claim 1, wherein said nanotubes are in the form of aggregates.

3. The field emission device of claim 1, wherein said nanotubes are single wall nanotubes.

4. The field emission device of claim 1, wherein said nanotubes have been treated with a beam of ions selected from the group consisting of gallium, hydrogen, helium, argon, carbon, oxygen, and xenon ions.

5. The field emission device of claim 1, wherein said nanotubes are in the form of a film or mat.

6. The field emission device of claim 1, wherein said cathode further includes a binder comprising a conductive carbon paste, a conductive metal paste or a carbonizable polymer.

7. A field emission cathode comprising carbon nanotubes, wherein said nanotubes have been treated with an ion beam and wherein said nanotubes are substantially cylindrical carbon fibrils having one or more graphitic layers concentric with their cylindrical axes, said carbon fibrils being substantially free of pyrolytically deposited carbon overcoat, having a substantially uniform diameter between 1 nm and 100 nm and having a length to diameter ratio greater than 5.

8. The field emission cathode of claim 7, wherein said nanotubes are in the form of aggregates.

9. The field emission cathode of claim 7, wherein said nanotubes are single wall nanotubes.

10. The field emission cathode of claim 7, wherein said nanotubes have been treated with a beam of ions selected from the group consisting of gallium, hydrogen, helium, argon, carbon, oxygen, and xenon ions.

11. The field emission cathode of claim 7, further comprising a binder.

12. The field emission cathode of claim 11, wherein said binder is a conductive carbon paste, a conductive metal paste or a carbonizable polymer.

13. The field emission cathode of claim 7, wherein the nanotubes are deposited onto a substrate.

* * * * *